Patented Mar. 10, 1925.

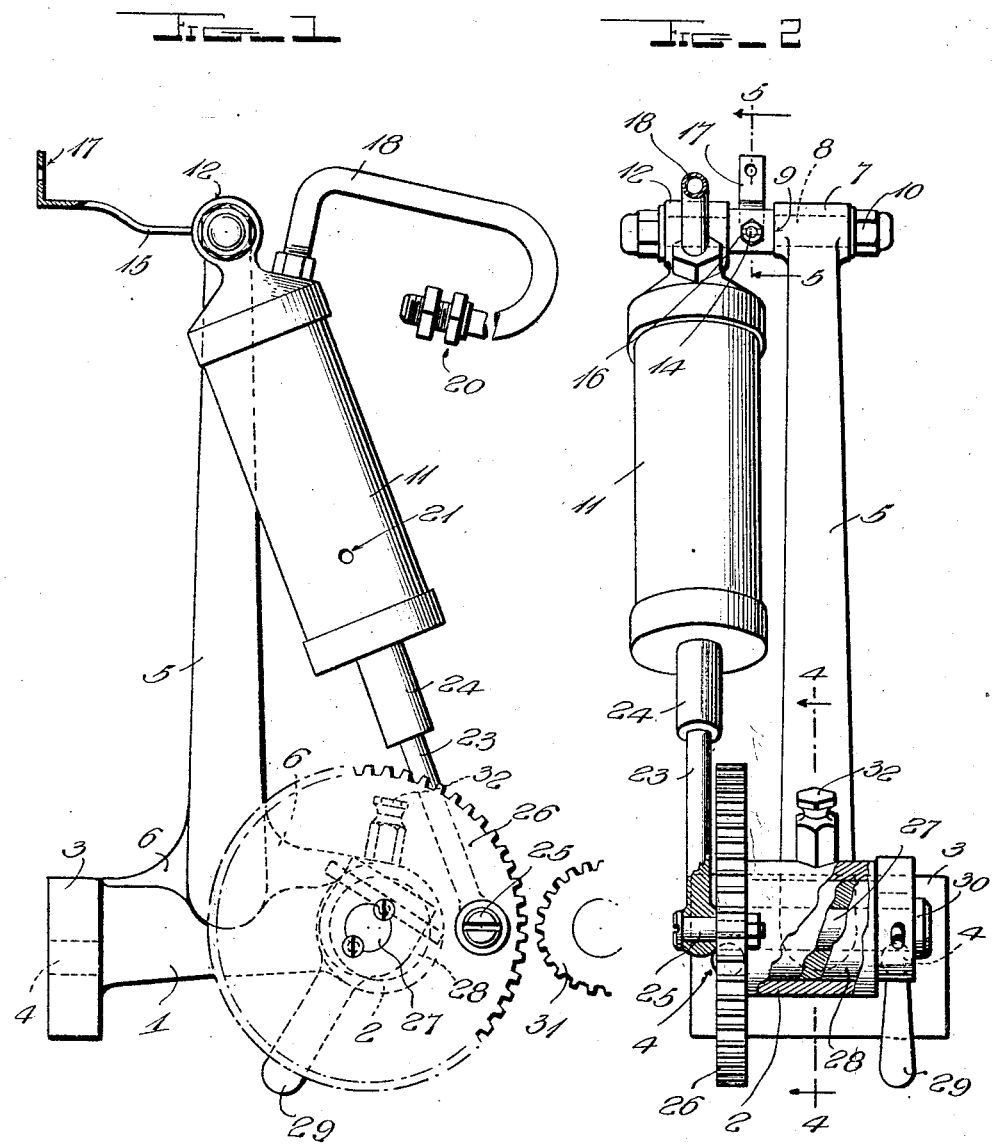

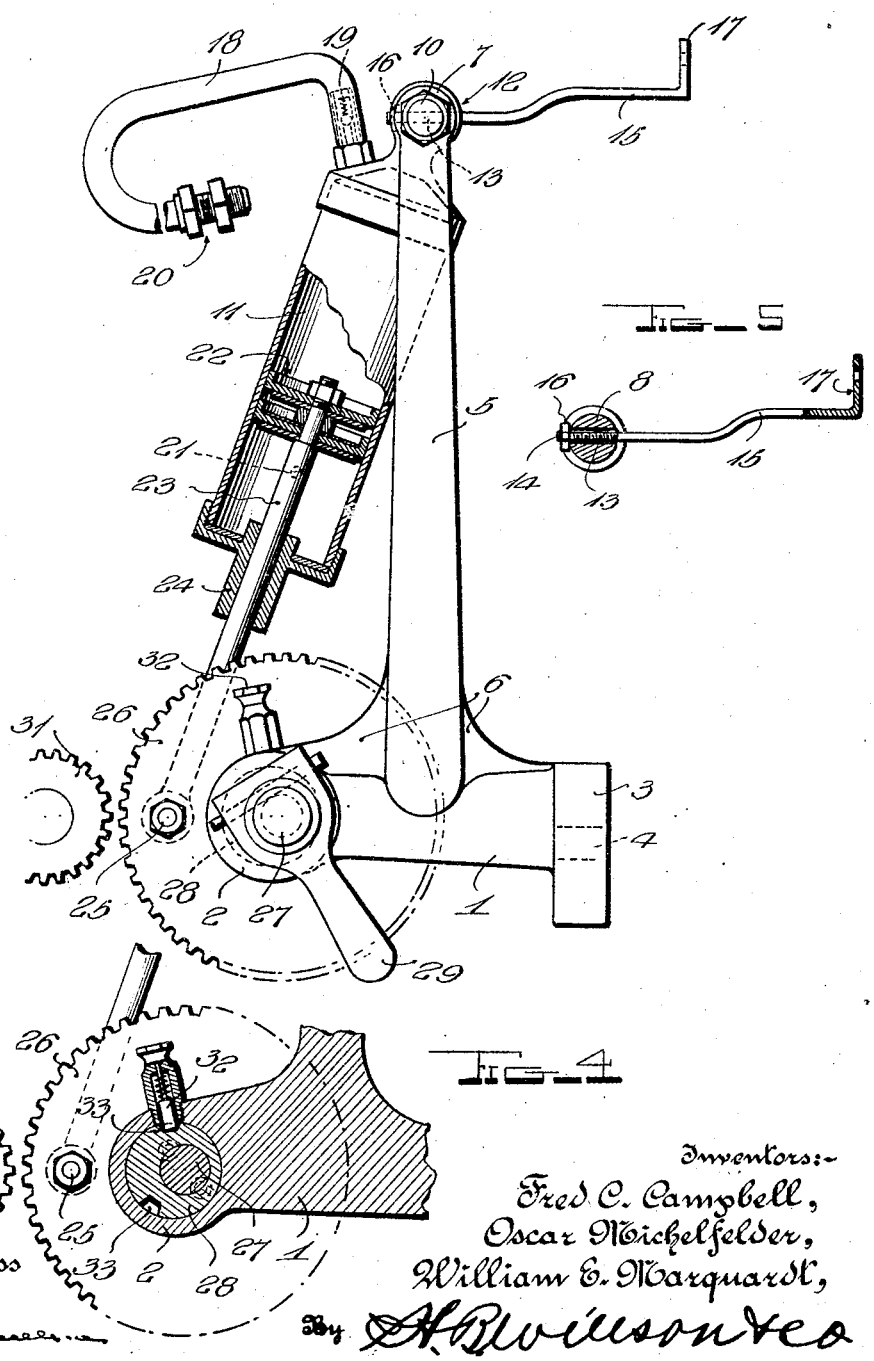

1,529,116

UNITED STATES PATENT OFFICE.

FRED C. CAMPBELL, WILLIAM E. MARQUARDT, AND OSCAR MICHELFELDER, OF ANN ARBOR, MICHIGAN.

POWER-DRIVEN TIRE PUMP.

Application filed July 3, 1924. Serial No. 724,043.

*To all whom it may concern:*

Be it known that we, FRED C. CAMPBELL, WILLIAM E. MARQUARDT, and OSCAR MICHELFELDER, citizens of the United States, residing at Ann Arbor, in the county of Washtenaw and State of Michigan, respectively, have invented certain new and useful Improvements in Power-Driven Tire Pumps; and we do declare the following to be a full, clear, and exact description of the invention, such as will enable others skilled in the art to which it appertains to make and use the same.

Our invention relates to improvements in attachments for automobiles, for the purpose of inflating the tires thereof, by means of a motor driven pump.

It is the principal object of the invention to provide a pump attachment which is of extremely simple and inexpensive nature, yet is efficient and desirable, may be easily attached, and may be quickly and easily thrown into or out of play.

With the foregoing in view, the invention resides in the novel subject matter hereinafter described and claimed, the description being supplemented by the accompanying drawings.

Figure 1 is a side elevation of a pump attachment constructed in accordance with our invention.

Figure 2 is an edge view partly in section.

Figure 3 is a side elevation partly in section, looking oppositely from Fig. 1.

Figure 4 is a detail vertical sectional view on line 4—4 of Fig. 2.

Figure 5 is a similar view on line 5—5 of Fig. 2.

In the drawings above briefly described, showing the preferred form of our invention, the numeral 1 designates a horizontally elongated base having a transverse horizontal bearing 2 at one end while its other end is provided with a vertical, plate-like attaching portion 3 having openings 4 through which bolts or the like may be passed to secure the base to a part of the chassis frame or to any other desired fixed part of an automobile. A standard 5 is integral with and rises from the intermediate portion of the base 1, suitable webs 6 being preferably provided in the angles between the two, for reinforcing purposes. The upper end of the standard is formed with a horizontal bearing 7 and one end of a horizontal bolt 8 passes through said bearing in such a manner that the bolt may be turned for a purpose hereinafter set forth. This bolt is provided with a shoulder 9 which abuts one end of the bearing 7 and is also equipped with a clamping nut 10 which engages the other end of said bearing, so that the bolt may be locked against turning, when desired.

At one side of the standard 5, is an oscillatory pump cylinder 11 which is provided at its upper end with a bearing 12 suitably mounted upon the bolt 8, in spaced relation with the bearing 7. In the construction shown, this bolt is provided, between the bearings 7 and 12, with an opening 13, and the reduced, threaded end 14 of a brace bar 15, passes rotatably through said opening 13 and may be secured by a nut 16. The other end 17 of the brace bar 15 is preferably bent laterally and formed with a bolt hole, so that it may be connected with a part of the automobile motor, to brace the standard and cylinder against excessive vibration. Attention may here be directed to the fact that by loosening the nut 16, the brace bar 15 may be turned about its longitudinal axis and by loosening the nut 10, the bolt 8 may turn to permit vertical swinging of said bar. Hence, the opening in its lateral end 17 may be readily alined, for instance, with one of the manifold bolts on one side of the automobile motor, so that such bolt may be used to secure the brace.

An air outlet pipe 18 is shown leading from the upper end of the cylinder 11 and provided with a check valve 19, said pipe also having an appropriate coupling 20 by means of which it may be connected with an inflation hose. The lower end of the cylinder 11 is formed with an air admission opening 21 below a suitable piston 22 which is provided with a one-piece piston rod 23 projecting slidably through a guide 24 with which the lower end of the cylinder is equipped. In the present showing, the lower end of rod 24 is connected by a wrist pin 25 with a vertically disposed spur gear 26, this gear being equipped with a horizontal shaft 27 mounted within an eccentric sleeve 28 which passes through the bearing 2. On one end of this eccentric sleeve, a handle 29 is secured, said handle abutting one end of the bearing 2 while the gear 26 abuts the other end thereof. The gear prevents movement of the shaft 27 in one direction and the free end of this shaft is provided with a shoulder 30 abutting the handle 29 on sleeve 28, so that this sleeve cannot slide out of the bearing 2.

The gear 26 is adapted to mesh with a pinion 31 which may be secured on the pump or generator shaft of the motor. Normally however, the handle 29 is swung to such a position that the eccentric sleeve 28 holds the gear 26 out of mesh with the pinion. When the pump is to be used, the handle is operated to cause the sleeve 28 to shift the gear 26 into mesh with the pinion 31. Any suitable means, such as a spring pressed locking pin 32, may be carried by the bearing 2 to engage one or more sockets 33 in the sleeve 28, for the purpose of holding the latter in the position to which it is moved.

It will be seen from the foregoing that the device is extremely simple and inexpensive, that it may be easily applied, that it may be quickly thrown into or out of play, and that it will be of great advantage for rapidly and easily inflating automobile tires.

As excellent results may be obtained from the details disclosed, such details are preferably followed, but within the scope of the invention as claimed, numerous minor changes may be made.

We claim:—

1. A tire pump attachment for an automobile comprising a base adapted to be rigidly secured to a fixed part of the machine, a standard rising rigidly from said base and having a horizontal bearing at its upper end, a bolt passing turnably at one end through said bearing and having a shoulder abutting one end of the bearing, a clamping nut threaded on said bolt and abutting the other end of the bearing, a pump including an oscillatory cylinder pivoted on the aforesaid bolt, and a brace secured at one end to said bolt, the other end of said brace being adapted to be secured to a fixed part of the automobile.

2. A tire pump attachment for an automobile comprising a base adapted to be rigidly secured to a fixed part of the machine, a standard rising rigidly from said base and having a horizontal bearing at its upper end, a bolt passing turnably at one end through said bearing and having a shoulder abutting one end of the bearing, a clamping nut threaded on said bolt and abutting the other end of the bearing, a pump including an oscillatory cylinder pivoted on the aforesaid bolt in spaced relation with said bearing, said bolt having a transverse opening between said cylinder and bearing, a brace having a reduced threaded end passing through said opening, and a clamping nut threaded on said reduced end of the brace, the other end of the latter being adapted to be secured to a fixed part of the automobile.

In testimony whereof we have hereunto affixed our signatures.

FRED C. CAMPBELL.
WILLIAM E. MARQUARDT.
OSCAR MICHELFELDER.